(12) United States Patent
Pouchelon et al.

(10) Patent No.: US 7,642,331 B2
(45) Date of Patent: Jan. 5, 2010

(54) COMPOSITION BASED ON SILICONE OILS THAT CAN BE CROSSLINKED INTO ELASTOMERS FOR THE IMPREGNATION TREATMENT OF FIBROUS MATERIALS

(75) Inventors: Alain Pouchelon, Meyzieu (FR); Maryline Quemin, Lyons (FR); Francis Lafaysse, Saint-Genis Layal (FR)

(73) Assignee: Rhodia Chimie, Boulogne-Billancourt (FR)

( * ) Notice: Subject to any disclaimer, the term of this patent is extended or adjusted under 35 U.S.C. 154(b) by 306 days.

(21) Appl. No.: 10/522,578

(22) PCT Filed: Jul. 16, 2003

(86) PCT No.: PCT/FR03/50017

§ 371 (c)(1),
(2), (4) Date: Jan. 23, 2006

(87) PCT Pub. No.: WO2004/013241

PCT Pub. Date: Feb. 12, 2004

(65) Prior Publication Data

US 2006/0142523 A1 Jun. 29, 2006

(30) Foreign Application Priority Data

Jul. 30, 2002 (FR) .................................. 02 09676

(51) Int. Cl.
*C08G 77/06* (2006.01)
*D06M 15/19* (2006.01)
(52) U.S. Cl. ........................................ 528/15; 428/365
(58) Field of Classification Search .................... 528/15
See application file for complete search history.

(56) References Cited

U.S. PATENT DOCUMENTS

| | | | | | |
|---|---|---|---|---|---|
| 4,287,261 | A | * | 9/1981 | West et al. ................... | 428/421 |
| 4,472,470 | A | * | 9/1984 | Modic ......................... | 428/145 |
| 4,500,584 | A | * | 2/1985 | Modic ......................... | 428/145 |
| 5,296,298 | A | * | 3/1994 | Fujimoto et al. ............. | 428/447 |
| 5,298,317 | A | * | 3/1994 | Takahashi et al. ............. | 442/85 |
| 5,529,837 | A | * | 6/1996 | Fujiki et al. ................. | 442/136 |
| 5,567,498 | A | * | 10/1996 | McCarter et al. ............ | 428/113 |
| 5,607,183 | A | * | 3/1997 | Nishimura et al. ....... | 280/743.2 |
| 5,658,674 | A | * | 8/1997 | Lorenzetti et al. ........... | 428/447 |

(Continued)

FOREIGN PATENT DOCUMENTS

EP 0 553 840 3/1996

(Continued)

*Primary Examiner*—Randy Gulakowski
*Assistant Examiner*—Robert Loewe
(74) *Attorney, Agent, or Firm*—James C. Lydon (57) ABSTRACT

A hydrosilylation (polyaddition)-vulcanizing elastomer silicone composition, including (a) a vinylated polyorganosiloxane (POS), (b) at least one hydrogenated POS, (c) a platinum catalyst, (d) optionally a coupling agent, (e) optionally a mineral filler, (f) optionally a crosslinking inhibitor, and optionally a POS resin and functional additives. The composition has a dynamic viscosity between 1,000 and 7,000 mPa·s, at 25° C. before crosslinking and, after overall crosslinking by thermal effect has at least one of the following properties: a Shore A hardness of at least 2, a breaking strength of at least 0.5 N·mm$^{-1}$, and a breaking elongation of at least 50%. Also disclosed is a composite which is fully impregnated by means of a 100% bicomponent (RTV-2) silicone liquid.

10 Claims, 1 Drawing Sheet

U.S. PATENT DOCUMENTS

| | | | | |
|---|---|---|---|---|
| 5,708,054 A * | 1/1998 | Mine et al. | | 523/212 |
| 5,783,311 A * | 7/1998 | Lorenzetti et al. | | 428/447 |
| 5,789,084 A * | 8/1998 | Nakamura et al. | | 428/447 |
| 5,846,604 A * | 12/1998 | Caldwell | | 427/245 |
| 5,856,245 A * | 1/1999 | Caldwell et al. | | 442/76 |
| 5,872,172 A * | 2/1999 | Kimura et al. | | 524/493 |
| 5,877,256 A * | 3/1999 | Nakamura et al. | | 524/765 |
| 5,958,137 A * | 9/1999 | Caldwell et al. | | 118/663 |
| 5,998,536 A * | 12/1999 | Bertry et al. | | 524/557 |
| 6,037,279 A * | 3/2000 | Brookman et al. | | 442/71 |
| 6,200,915 B1 * | 3/2001 | Adams et al. | | 442/157 |
| 6,291,040 B1 * | 9/2001 | Moriwaki et al. | | 428/35.2 |
| 6,354,620 B1 * | 3/2002 | Budden et al. | | 280/728.1 |
| 6,369,184 B1 * | 4/2002 | Bohin et al. | | 528/15 |
| 6,387,451 B1 * | 5/2002 | Collins et al. | | 427/387 |
| 6,387,520 B1 * | 5/2002 | Fujiki et al. | | 428/447 |
| 6,395,338 B1 * | 5/2002 | Benayoun et al. | | 427/387 |
| 6,416,613 B1 * | 7/2002 | Patrick et al. | | 156/281 |
| 6,486,237 B1 * | 11/2002 | Howe et al. | | 524/71 |
| 6,562,180 B1 * | 5/2003 | Bohin et al. | | 156/329 |
| 6,562,737 B1 * | 5/2003 | Bohin et al. | | 442/59 |
| 6,586,551 B2 * | 7/2003 | Bohin et al. | | 528/15 |
| 6,670,418 B2 | 12/2003 | Mueller et al. | | 524/862 |
| 6,709,752 B1 * | 3/2004 | James et al. | | 428/447 |
| 6,805,912 B2 * | 10/2004 | Benayoun et al. | | 427/358 |
| 6,875,516 B2 * | 4/2005 | Benayoun et al. | | 428/447 |
| 6,902,816 B1 * | 6/2005 | Bertry et al. | | 428/447 |
| 2002/0082377 A1 * | 6/2002 | Bohin et al. | | 528/15 |
| 2006/0115656 A1 | 6/2006 | Martin | | 428/447 |
| 2006/0121221 A1 * | 6/2006 | Aketa et al. | | 428/35.4 |

FOREIGN PATENT DOCUMENTS

| | | |
|---|---|---|
| EP | 0 543 401 | 10/1996 |
| EP | 0 764 702 | 3/1997 |
| EP | 0 773 262 | 5/1997 |
| EP | 0 846 720 | 6/1998 |
| EP | 1078 823 | 2/2001 |
| EP | 0 718 452 | 10/2002 |

* cited by examiner

COMPOSITION BASED ON SILICONE OILS THAT CAN BE CROSSLINKED INTO ELASTOMERS FOR THE IMPREGNATION TREATMENT OF FIBROUS MATERIALS

The invention relates to a silicone elastomer composition that can be cured or vulcanized by hydro-silylation (polyaddition), especially of the two-component (RTV-2) type, which can be used for the treatment of fibrous materials (in particular the treatment of flexible supports such as woven supports or nonwoven supports).

The invention also relates to a composite consisting of a fibrous material treated by means of a silicone elastomer composition, especially of the RTV2 type.

The treatment of fibrous materials (in particular of flexible supports such as woven supports or nonwoven supports), by means of liquid silicone compositions that can be crosslinked in elastomers, is conventionally carried out by coating and, usually, by impregnation when the compositions are emulsions or solutions.

Silicone coating is defined as the action of coating a fibrous support, especially a textile, using a crosslinkable liquid silicone composition, and then in crosslinking the film coated on the support, so as to produce a coating intended in particular to protect it and to give it particular properties, for example to give it hydrophobic/oleophobic and impermeable characteristics or improved mechanical properties or else suitable for modifying the appearance thereof.

Impregnation is defined as the action of making a highly fluid crosslinkable silicone-based liquid penetrate into a fibrous support (penetration right to the core) and then in causing the silicone to crosslink in order to give the support properties of the type mentioned above.

In practice, silicone elastomer coatings on textile supports have many advantages owing to the intrinsic characteristics of silicones. These composites have in particular good flexibility, good mechanical strength and improved fire behavior.

Moreover, unlike conventional elastomers, silicones give them inter alia suitable protection owing to their hydrophobicity and to their excellent chemical, thermal and environmental resistance, and also long lifetime.

However, in the emerging field of silicone composites for textile architecture, the method of depositing the silicones by coating may be deficient. This is because architectural fabrics exposed to the weather must not be subject to the effect of capillary rise from the edges, which would impair their aesthetics and their lifetime. Moreover, coating does not represent an effective technique for protecting fibrous materials from the phenomenon of capillary rise.

To alleviate this, it is conceivable a priori to use the technique of impregnating fibrous materials by means of liquid silicone compositions, for example of the RTV-2 type, which can be crosslinked into elastomers.

However, the only liquid silicone compositions known hitherto for impregnating flexible supports, such as textiles or nonwoven fabrics, are fluid silicone solutions or emulsions.

In fact, before the invention there was a technical preconception that liquid silicone compositions consisting of silicone oils, for example of the RTV-2 type, could not be used for impregnating fibrous supports.

Notwithstanding this, the inventors have sought to develop a liquid silicone composition based on one or more oils, which can be crosslinked into an elastomer, at least for the impregnation treatment of fibrous materials (wovens or nonwovens), treated right to the core and on the surface, so as to exhibit improved properties in terms of mechanical reinforcement, water repellency, impermeability, appearance, fireproofing and above all resistance to capillary rise.

Another objective of the inventors is the manufacture of fiber/silicone composites exhibiting good mechanical properties and resistance to capillary rise, which composites can be produced by impregnation using the composition according to the invention.

These objectives, among others, were achieved by the inventors who have discovered, quite surprisingly, and despite the aforementioned technical preconception, that a liquid silicone composition whose liquid phase is essentially, if not exclusively, formed by one or more silicone oils that can be crosslinked, especially at room temperature, into an elastomer can be used for the impregnation treatment of fibrous supports in order to give them mechanical properties and capillary rise resistance properties that are very satisfactory.

It therefore follows that the invention first of all relates to a silicone composition for the treatment of fibrous material, which composition can be crosslinked into an elastomer, comprising:

(a) at least one polyorganosiloxane (POS) having, per molecule, at least two alkenyl, preferably $C_2$-$C_6$, groups linked to the silicon;

(b) at least one polyorganosiloxane having, per molecule, at least three hydrogen atoms linked to the silicon;

(c) a catalytically effective quantity of at least one catalyst, preferably composed of at least one metal belonging to the platinum group;

(d) optionally, at least one adhesion promoter;

(e) optionally, a mineral filler;

(f) optionally, at least one crosslinking inhibitor;

(g) optionally, at least one polyorganosiloxane resin; and (h) optionally, functional additives in order to impart specific properties; characterized in that:

it has a dynamic viscosity of between 1000 and 7000 mPa·s at 25° C. and more preferably between 2000 and 5000 mPa·s at 25° C. before crosslinking; and it has, after complete crosslinking by thermal action, that is, curing in a fan oven for 30 minutes at 150° C., at least one of the following mechanical properties:

a Shore A hardness of at least 2, preferably between 5 and 65, a tensile strength of at least 0.5 N·mm$^{-1}$, preferably at least 1.0 N·mm$^{-1}$ and more preferably at least 2 N·mm$^{-1}$ and an elongation at break of at least 50%, preferably at least 100% and more preferably at least 200%.

All the viscosities mentioned in the present application correspond to a dynamic viscosity quantity at 25° C., that is to say the dynamic viscosity that is measured, in a manner known per se, at a shear rate low enough for the measured viscosity to be independent of the shear rate.

Preferably:

this composition is fluid;

this composition is obtained without either diluting or dissolving or emulsifying it; and this composition is capable of impregnating a fibrous material right to the core and then of crosslinking.

To the knowledge of the inventors, such fluid compositions based on reactive silicone oils capable of curing by polyaddition have never been used for impregnating fibrous materials.

This composition also has the particular feature that it is capable of impregnating a fibrous material right to the core and then of crosslinking so as to form a composite having a capillary rise of less than 20 mm, preferably less than 10 mm and more preferably still equal to 0, the capillary rise being measured according to a T test.

The general techniques for impregnating fibrous materials, especially textiles, are well known to those skilled in the art. Among these, padding represents one technique particularly suitable for the method of the invention.

Advantageously, this liquid silicone composition is firstly applied by impregnation and then by coating using a liquid silicone composition that can be crosslinked into an elastomer.

The fact of carrying out a treatment that combines at least one impregnation with at least one coating with a silicone is a guarantee of quality as regards the fibrous material whose properties it is desired to modify, especially its resistance to capillary rise, without impairing the other mechanical, water repellency, fire resistance and appearance properties.

The fluidity of the crosslinkable liquid silicone coating composition is identical or different from the impregnation composition.

Advantageously, the fluidity of the silicone coating liquid is lower than that of the silicone impregnation liquid.

The silicone oil compositions, including the fluid impregnation compositions, comprise, according to the invention, a blend of polyorganosiloxanes (a) and (b).

The polyorganosiloxanes (a) used in the present invention preferably have units of formula:

$$W_a Z_b SiO_{(4-(a+b))/2} \qquad (a.1)$$

in which:

W is an alkenyl group;

Z is a monovalent hydrocarbon group, which has no unfavorable effect on the activity of the catalyst and chosen from alkyl groups having from 1 to 8 carbon atoms inclusive, optionally substituted with at least one halogen atom, and from aryl groups;

a is 1 or 2, b is 0, 1 or 2 and a+b is between 1 and 3; and optionally, at least one portion of the other units are units of average formula:

$$Z_c SiO_{(4-c)/2} \qquad (a.2)$$

in which W has the same meaning as above and c has a value between 0 and 3.

The polyorganosiloxane (a) may be predominantly formed from units of formula (a.1) or it may also contain units of formula (a.2). Likewise, it may have a linear structure and its degree of polymerization is preferably between 2 and 5000.

W is generally chosen from methyl, ethyl and phenyl radicals, at least 60 mol % of the radicals W being methyl radicals.

Examples of siloxyl units of formula (a.1) are the vinyldimethylsiloxane unit, the vinylphenylmethylsiloxane unit and the vinylsiloxane unit.

Examples of siloxyl units of formula (a.2) are the $SiO_{4/2}$, dimethylsiloxane, methylphenylsiloxane, diphenylsiloxane, methylsiloxane and phenylsiloxane units.

Examples of polyorganosiloxanes (a) are dimethylvinylsilyl-terminated dimethylpolysiloxanes, trimethylsilyl-terminated methylvinyldimethylpolysiloxanes copolymers, dimethylvinylsilyl-terminated methylvinyldimethylpolysiloxane copolymers and cyclic methylvinylpolysiloxanes.

The dynamic viscosity $\eta_d$ of this polyorganosiloxane (a) is between 0.01 and 200 Pa·s, preferably between 0.1 and 100 Pa·s.

Preferably, the POS (a) comprises at least 98% of siloxyl units D: —$R_2SiO_{2/2}$ where R satisfies the same definition as W or Z, this percentage corresponding to a number of units per 100 silicon atoms.

As regards the silicone oil compositions according to the invention, the preferred polyorganosiloxane (b) compositions contain siloxyl units of formula:

$$H_d L_e SiO_{(4-(d+e))/2} \qquad (b.1)$$

in which:

L is a monovalent hydrocarbon group, which has no unfavorable effect on the activity of the catalyst and chosen from alkyl groups having from 1 to 8 carbon atoms inclusive, optionally substituted with at least one halogen atom, and from aryl groups;

d is 1 or 2, e is 0, 1 or 2 and d+e has a value between 1 and 3;

optionally, at least one portion of the other units being units of average formula:

$$L_g SiO_{(4-g)/2} \qquad (b.2)$$

in which L has the same meaning as above and g has a value between 0 and 3.

As examples of polyorganosiloxanes (b), mention may be made of poly(dimethylsiloxane) (methylhydrogenosiloxy)-α,ω-dimethylhydrogenosiloxane.

The polyorganosiloxane (b) may be formed only from units of formula (b.1) or may also include units of formula (b.2).

The polyorganosiloxane (b) may have a linear, branched, cyclic or network structure. The degree of polymerization is greater than or equal to 2 and more generally is less than 100.

The dynamic viscosity $\eta_d$ of this polyorganosiloxane (b) is between 5 and 1000 mPa·s, preferably between 10 and 100 mPa·s.

The group L has the same meaning as the group Z above.

Examples of units of formula (b.1) are: $H(CH_3)_2SiO_{1/2}$, $HCH_3SiO_{2/2}$ and $H(C_6H_5)SiO_{2/2}$.

The examples of units of formula (b.2) are the same as those given above in the case of the units of formula (a.2).

Examples of polyorganosiloxanes (b) are:

hydrogenodimethylsilyl-terminated dimethylpolysiloxanes;

copolymers containing trimethylsilyl-terminated (dimethyl)-(hydrogenomethyl)polysiloxane units;

copolymers containing hydrogenodimethylsilyl-terminated dimethyl-hydrogenomethylpolysiloxane units;

trimethylsilyl-terminated hydrogenomethylpolysiloxanes;

cyclic hydrogenomethylpolysiloxanes; and hydrogenosiloxane resins containing siloxyl units M: $R_3SiO_{1/2}$, Q: $SiO_{4/2}$ and/or T: $RSiO_{3/2}$ and optionally D: $R_2SiO_{2/2}$, with R=H or satisfying the same definition as L.

As other examples of monovalent hydrocarbon groups Z or L that can be present in the abovementioned POSs (a) and (b), mention may be made of: methyl; ethyl; n-propyl; isopropyl; n-butyl; isobutyl; tert-butyl; chloromethyl; dichloromethyl; α-chloroethyl; α,β-dichloroethyl; fluoromethyl; difluoromethyl; α,β-difluoroethyl, 3,3,3-trifluoropropyl; trifluorocyclopropyl; 4,4,4-trifluorobutyl; 3,3,5,5,5,5-hexafluoropentyl; β-cyanoethyl; γ-cyanopropyl; phenyl; p-chlorophenyl; m-chlorophenyl; 3,5-dichlorophenyl; trichlorophenyl; tetrachlorophenyl; o-, p- or m-tolyl; α,α,α-trifluorotolyl; xylyl; 2,3-dimethylphenyl; 3,4-dimethylphenyl.

These groups may optionally be halogenated, or else may be chosen from cyanoalkyl radicals. The halogens are for example fluorine, chlorine, bromine and iodine, preferably chlorine or fluorine. The POSs (a) and (b) may consist of blends of various silicone oils.

Preferably, the proportions of (a) and of (b) are such that the molar ratio of the hydrogen atoms linked to the silicon in (b) to the alkenyl radicals linked to the silicon in (a) is between 0.4 and 10.

According to a variant, the silicone phase of the composition comprises at least one polyorganosiloxane resin (g) containing at least one alkenyl residue in its structure, and this resin has a weight content of alkenyl groups of between 0.1 and 20% by weight and preferably between 0.2 and 10% by weight. These resins are well-known branched organopolysiloxane oligomers or polymers that are commercially available. Preferably, they are in the form of siloxane solutions and contain, in their structure, at least two different units chosen from those of formula $R_3SiO_{0.5}$ (M unit), $R_2SiO$ (D unit), $RSiO_{1.5}$ (T unit) and $SiO_2$ (Q unit), at least one of these units being a T or Q unit.

The radicals R are identical or different and are chosen from $C_1$-$C_6$ linear or branched alkyl radicals, $C_2$-$C_4$ alkenyl radicals, phenyl and 3,3,3-trifluoropropyl. As alkyl radicals R, mention may be made, for example, of methyl, ethyl, isopropyl, tert-butyl and n-hexyl radicals and, as alkenyl radicals R, vinyl radicals.

It should be understood that some of the radicals R in the resins (g) of the aforementioned type are alkenyl radicals.

As examples of branched organopolysiloxane oligomers or polymers, mention may be made of MQ resins, MDQ resins, TD resins and MDT resins, it being possible for the alkenyl functional groups to be carried by the M, D and/or T units. As examples of resins that are particularly suitable, mention may be made of vinyl-containing MDQ or MQ resins having a weight content of vinyl groups of between 0.2 and 10% by weight, these vinyl groups being carried by the M and/or D units. This structure of resin is advantageously present in a concentration of between 10 and 70% by weight, preferably between 30 and 60% by weight and even more preferably between 40 and 60% by weight relative to all of the constituents of the composition.

The polyaddition reaction is well known to those skilled in art. It is also possible to use a catalyst in this reaction. Such a catalyst may especially be chosen from platinum and rhodium compounds. In particular, it is possible to use complexes of platinum and an organic substance, described in U.S. Pat. No. 3,159,601, U.S. Pat. No. 3,159,602 and U.S. Pat. No. 3,220,972 and European patents EP-A-0 057 459, EP-A-0 188 978 and EP-A-0 190 530, complexes of platinum with a vinyl-containing organosiloxane, which are described in U.S. Pat. No. 3,419,593, U.S. Pat. No. 3,715,334, U.S. Pat. No. 3,377,432 and U.S. Pat. No. 3,814,730. The catalyst generally preferred is platinum. In this case, the quantity by weight of catalyst (c), calculated by weight of platinum metal, is generally between 2 and 400 ppm and preferably between 5 and 100 ppm, these values being based on the total weight of the polyorganosiloxanes (a) and (b).

In one advantageous method of implementing the process according to the invention, an adhesion promoter may be used. This adhesion promoter may for example comprise:

(d.1) at least one alkoxylated organosilane satisfying the following general formula:

(d.1)

in which:

$R^1$, $R^2$, $R^3$ are hydrogenated or hydrocarbon radicals, which are the same or differ from one another and represent hydrogen, a $C_1$-$C_4$ linear branched alkyl or a phenyl optionally substituted with at least one $C_1$-$C_3$ alkyl;

A is a $C_1$-$C_4$ linear or branched alkylene;

G is a valency bond;

$R^4$ and $R^5$ are radicals, which are identical or different and represent a linear or branched $C_1$-$C_4$ alkyl;

x'=0 or 1; and x=0 to 2, said compound (d.1) being preferably vinyltrimethoxysilane (VTMS);

(d.2) at least one organosilicon compound comprising at least one epoxy radical, said compound (d.2) being preferably 3-glycidoxypropyltrimethoxysilane (GLYMO); and (d.3) at least one metal M chelate and/or a metal alkoxide of general formula $M(OJ)_n$, where n=valency of M and J=$C_1$-$C_8$ linear or branched alkyl, M being chosen from the group formed by: Ti, Zr, Ge, Li, Mn, Fe, Al and Mg, said compound (d.3) preferably being tert-butyl titanate.

The proportions of (d.1), (d.2) and (d.3), expressed as a percent by weight relative to the total of the three, are preferably the following:

(d.1)≧10, (d.2)≧10, (d.3)≧80.

Moreover, this adhesion promoter (d) is preferably present in an amount of 0.1 to 10%, preferably 0.5 to 5% and even more preferably 1 to 2.5% by weight relative to all of the constituents of the composition.

It is also possible to provide a filler (e), which will preferably be a mineral filler. It may consist of the products chosen from siliceous (or nonsiliceous) materials.

With regard to siliceous materials, these may act as a reinforcing or semireinforcing filler.

The reinforcing siliceous fillers are chosen from colloidal silicas, fumed silica powders, precipitated silica powders or mixtures thereof.

These powders generally have a mean particle size of less than 0.1 μm and a BET specific surface of greater than 50 m²/g, preferably between 100 and 300 m²/g.

The semireinforcing siliceous fillers, such as diatomaceous earths or ground quartz, may also be employed.

As regards the nonsiliceous mineral materials, these may act as semireinforcing mineral filler or bulking filler. Examples of these nonsiliceous fillers that can be used by themselves or as a mixture are carbon black, titanium dioxide, aluminum oxide, hydrated alumina, expanded vermiculite, zirconia, a zirconate, unexpanded vermiculite, calcium carbonate, zinc oxide, mica, talc, iron oxide, barium sulfate and slaked lime. These fillers have a particle size generally between 0.01 and 300 μm and a BET surface area of less than 100 m²/g.

For practical purposes the filler employed is a silica, but this is in no way limiting.

The filler may be treated by means of any suitable compatibilizing agent, especially hexamethyldisilazane. For further details in this regard, the reader may refer for example to patent FR-B-2 764 894.

As regards weights, it is preferred to use a quantity of filler of between 5 and 30%, preferably between 7 and 20%, by weight relative to all of the constituents of the composition.

Advantageously, the silicone elastomer composition furthermore includes at least one retarder (f) (or crosslinking inhibitor) for retarding the addition reaction, chosen from the following compounds:

polyorganosiloxanes, advantageously cyclic polyorganosiloxanes substituted with at least one alkenyl, tetramethylvinyltetrasiloxane being particularly preferred;
pyridine;
organic phosphines and phosphites;
unsaturated amides;
alkyl maleates; and
acetylenic alcohols.

These acetylenic alcohols (cf. FR-B-1 528 464 and FR-A-2 372 874), which are included among the preferred hydrosilylation reaction thermal blockers, have the formula:

in which formula:
R is a linear or branched alkyl radical or a phenyl radical;
R' is H or a linear or branched alkyl radical or a phenyl radical;
it being possible for the R, R' radicals and the carbon atom situated a to the triple bond to optionally form a ring;
the total number of carbon atoms contained in R and R' being at least 5, preferably from 9 to 20.

Said alcohols are preferably chosen from those having a boiling point above 250° C. As examples, mention may be made of:
1-ethynyl-1-cyclohexanol;
3-methyl-1-dodecyn-3-ol;
3,7,11-trimethyl-1-dodecyn-3-ol;
1,1-diphenyl-2-propyn-1-ol;
3-ethyl-6-ethyl-1-nonyn-3-ol; and
3-methyl-1-pentadecyn-3-ol.

These α-cetylenic alcohols are commercially available products.

Such a retarder (f) is present in an amount of 3000 ppm at most, preferably in an amount of 100 to 2000 ppm relative to the total weight of the organopolysiloxanes (a) and (b).

With regard to the functional additives (h) that can be employed, these may be covering products, such as for example pigments/dies or stabilizers.

The subject of the invention is also a two-component precursor system for the above mentioned composition. This two-component system is characterized in that:
it is in two separate parts A and B that are intended to be mixed together to form the composition, and in that one of these parts A and B contains the catalyst (c) and only one polyorganosiloxane species (a) or (b); and
part A or B containing the polyorganosiloxane (b) contains no compound (d.3) of the promoter (d).

The composition may therefore for example, consist of a part (a) comprising the compounds (d.1) and (d.2), while part (b) contains the compound (d.3), in order to obtain the two-component silicone elastomer composition A-B.

If a filler is used, it is advantageous firstly to prepare a primary paste by mixing a mineral filler with at least some of the POS (b) and at least some of the polyorganosiloxane (a).

This paste serves as a basis for obtaining, on the one hand, a part A resulting from mixing the latter with the polyorganosiloxane (b), optionally a crosslinking inhibitor and finally the compounds (d.1) and (d.2) of the promoter (d). The part B is produced by mixing some of the abovementioned paste with polyorganosiloxane (a), with catalyst (Pt) and with compounds (d.3) of the promoter (d).

The viscosity of the parts A and B and of their mixture can be adjusted by varying the quantities of the constituents and by choosing polyorganosiloxanes of different viscosity.

If one or more functional additives (h) are employed, they are distributed in the parts A and B according to their affinity with the content of A and B.

Once the parts A and B have been mixed together, they form a ready-to-use silicone elastomer composition (RTV-2) which can be applied on the support by any suitable impregnation means (for example, padding) and optionally any suitable coating means (for example a doctor blade or roll).

The crosslinking of the liquid (fluid) silicone composition applied on the support to be impregnated, or even coated, is generally activated for example by heating the impregnated, or coated, support to a temperature of between 50 and 200° C., while obviously taking into account the maximum heat resistance of the support.

According to another of its aspects, the invention relates to the use of a or of a system such as those defined above, in order to impregnate a fibrous support, with the exception of any architectural textile. The term "architectural textile" is understood to mean a woven or nonwoven fabric, and more generally any fibrous support intended, after coating, for making up:
shelters, movable structures, textile buildings, partitions, flexible doors, tarpaulins, tents, stands or marquees;
furniture, claddings, billboards, windshields or filter panels;
solar protection panels, ceilings and blinds.

The subject of the invention is also a fiber/crosslinked silicone elastomer composite, to the exclusion or otherwise of any architectural textile as defined above, characterized in that it comprises at least one fibrous support impregnated right to the core with a crosslinked silicone elastomer obtained from a liquid silicone composition or from a two-component system which is a precursor for this composition, such as those defined above, this composition being fluid and obtained without diluting or dissolving or emulsifying it.

As examples of fiber/crosslinked silicone elastomer composites, mention may be made of flexible raw materials for making up airbags used for protecting the occupants of a vehicle, glass braids (woven glass sheaths for thermal and dielectric protection for electrical wires), conveyor belts, fire-barrier or thermal insulation fabrics, compensators (flexible sealing sleeves for pipe work), clothing, or else flexible materials intended to be used in indoor or outdoor textile architecture (tarpaulins, tents, stands, marquees, etc.).

The fibrous supports intended to be impregnated may for example be woven fabrics, nonwoven fabrics, or knits, or more generally any fibrous support comprising fibers and/or fibers chosen from the group of materials comprising: glass, silica, metals, ceramic, silicon carbide, carbon, boron; natural fibers, such as cotton, wool, hemp, flax; artificial fibers, such as viscose or cellulose fibers; synthetic fibers, such as polyesters, polyamides, polyacrylics, "chlorofibers", polyolefins, synthetic rubbers, polyvinyl alcohol, aramides, "fluorofibers", phenolics, etc.

The subject of the invention is also a fiber/crosslinked silicone elastomer composite that can be obtained by impregnation by means of the liquid silicone composition or the abovementioned two-component system, characterized by a capillary rise of less than 20 mm, preferably less than 10 mm and more preferably still equal to 0, the capillary rise being measured according to a T test.

The following examples have been given for the purpose of illustrating particular embodiments of the invention, without limiting the latter to these simple particular embodiments.

EXAMPLE I

Preparation, Impregnation and Properties of a Silicone Oil Composition According to the Invention I.1—Preparation The following materials were progressively mixed, in a reactor at room temperature, in the proportions indicated below (in parts by weight):

96.6 parts of an MM(Vi)D(Vi)DQ resin containing about 0.6% Vi;

11 parts of poly(diMe)(Mehydrogenosiloxy)-α, ω)-diMehydrogenosiloxy, having a viscosity of 25 mPa·s and containing 20% SiH;

0.025 parts of a ethynylcyclohexanol;
1 part of vinyltrimethoxysilane;
1 parts of 3-glycidoxypropyltrimethoxysilane;
0.4 parts of butyl titanate;
0.022 parts of Karstedt's platinum crosslinking catalyst.

NB: Me corresponds to a methyl radical.

I.2—Properties of the Composition Thus Prepared

Viscosity:

The viscosity of the composition prepared was measured by means of a Brookfield viscometer: viscosity=2.3 Pa·s.

Reactivity:

The reactivity of the bath was assessed by measuring its gel time in a Gel Timer GelNorm sold by OSI: reactivity at 70° C.=30 minutes.

I.3—Impregnation

I.3.a A 200 g/m$^2$ woven polyester fabric was impregnated with the composition by means of a laboratory calender. The impregnation conditions were the following:
diameter of the rolls: 10 cm (width 25 cm)
run speed: 1 m/min
applied pressure: 20 kg/cm
degree of squeezing: 35%

I.3.b A 300 g/m$^2$ woven glass fabric was impregnated with the composition by means of a laboratory calender. The impregnation conditions were the following:
diameter of the rolls: 10 cm (width 25 cm)
run speed: 1 m/min
applied pressure: 22 kg/cm
degree of squeezing: 30%

I.4—Crosslinking

The silicone composition deposited was crosslinked by placing the resulting composite in a fan oven at 150° C. for 1 minute.

I.5—Mechanical Properties of the Silicone Impregnation Elastomer after Crosslinking The mechanical usage properties were measured according to the standards of the art on the basis of a pin 6 mm in thickness as regards hardness and a test plaque 2 mm in thickness for the tensile strength experiments. The crosslinking was completed by curing in a fan oven at 150° C. for 30 minutes.

| | |
|---|---|
| Shore A hardness: | 33 |
| Tensile strength: | 3.9 MPa |
| Elongation at break: | 140%. |

I.6—Inspection of the Impregnation

The penetration of the composition into the fabric was observed using scanning electron microscopy.

Figure 1:
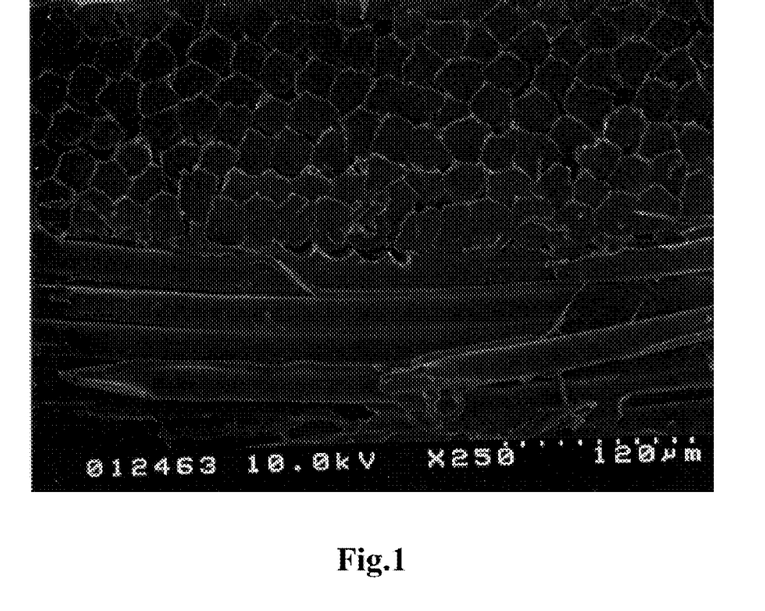
FIG. 1 is a micrograph of a section through a silicone composite based on fibrous material.

The micrograph in FIG. 1 shows a sectional view of the composite obtained in Example I.3a. The corresponding scale is displayed on the image. It demonstrates the quality of the impregnation, revealing the compactness of the resulting composite. This micrograph shows the quality of the impregnation obtained by the process forming the subject of the invention. The absence of fluidizing solvent or emulsion prevents the formation of solvent pockets in the matrix of the crosslinked silicone composition.

I.7—Resistance to Capillary Rise

Analytical Procedure:

The capillary rise is given by the height to which a liquid with which the end of a composite strip is brought into contact, according to a T test, rises.

The T Test is Carried Out as Follows:

A strip measuring 2×20 cm of the fiber/silicone composite was cut;

a tank containing a colored ink (for example fountain pen ink);

the cut strip of fibrous material was suspended above the ink bath so as to make the strip flush with the ink;

the 0 level was defined as the meniscus line of the ink on the strip;

the composite strip was left in place until the rising front of ink was in equilibrium;

the height (H) in millimeters, corresponding to the difference between the 0 level and the maximum rise level of the ink along the strip, was measured.

The capillary rise is defined by the distance H. The resistance to capillary rise is inversely proportional to H.

Results

Figure 2:
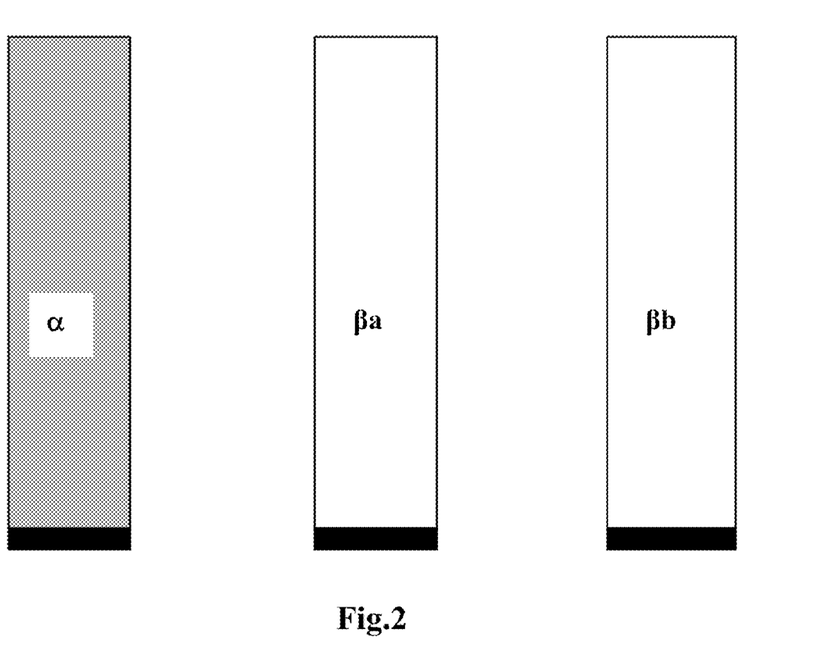
FIG. 2 is a diagram showing the results of a T test for comparing capillary rise, carried out on three strips of fabric, α (control) and βa, βb (Example I.7).

The diagrams shown in FIG. 2 represent comparisons between the trace of such capillary rises for three strips of fabric:

the control strip α on the left corresponds to a strip cut from a nonimpregnated fibrous material coated with 200 g/m$^2$ of silicone elastomer on each face;

the strip βa in the center corresponds to a strip cut from a composite according to the invention, i.e. produced from a polyester-based fibrous material impregnated according to the invention and then coated with 120 g/m$^2$ of silicone elastomer on each face; and the strip βb on the right corresponds to a strip cut from a composite according to the invention, i.e. produced from a glass-based fibrous material impregnated according to the invention and then coated with 100 g/m² of silicone elastomer on each face.

The strips (β) of the silicone architectural membrane (composite) according to the invention has a zero capillary rise, whereas the control strip (α) has a capillary rise of more than 100 mm.

It may thus be clearly seen that the impregnation according to the invention guards against the capillary rise, which in its absence would occur over the entire specimen.

A formulation capable of satisfying the compromise of a low viscosity suitable for impregnating textiles and of mechanical properties sufficient for the characteristics of the composite has been demonstrated. It should be noted that the properties achieved allow the product to be classified in the range of elastomers; in particular, the elongation and the hardness are typical of this class.

With such a composition, the level of impregnation of the textile is excellent, thereby limiting the capillary rise by infiltration along the fibers of the fabric, which would be poorly sheathed with the hydrophobic polymer.

EXAMPLE II

Fluid Silicone Oil Compositions According to the Invention

The examples below demonstrate that, with very fluid compositions such as those presented, it is possible to cover a wide hardness range of elastomers while maintaining reasonable mechanical properties.

The compositions presented are, as in the first example, prepared cold by simple mixing. However, they were prepared so as to have two parts, A and B, that were combined together in the ratio 100 A/10 B just before they were used.

Tables (I) and (II) below give these compositions and the properties that they develop.

TABLE I

| | 2-1 | 2-2 | 2-3 |
|---|---|---|---|
| Part A | | | |
| MM$^{vi}$D$^{vi}$DQ resin, containing 0.6% Vi, consisting of 17% M, 0.5% Mvi, 75% D, 1.5% D$^{vi}$ and 6% Q | 92 | 90 | 45 |
| PolydiMeMeVi α,ω-vinylsiloxane, containing 2.5% Vi and of 0.4 Pa·s viscosity | 0 | 0 | 45 |
| Tetra Me, tetra Vi tetrasiloxane. | 0 | 2 | 0 |
| PolydiMediMehydrogeno, α,ω-SiH, containing 7.5% SiH and of 0.3 Pa·s viscosity | 8 | 13 | 0 |
| PolydiMehydrogeno, α,ω-Me$_3$ of 0.02 Pa·s viscosity. | 0 | 0 | 8 |
| γ-Methacryloxypropyltrimethoxysilane | 1 | 1 | 1 |
| γ-Glycidoxypropyltrimethoxysilane | 1 | 1 | 1 |
| Ethynylcyclohexanol | 250 ppm | 250 ppm | 250 ppm |
| Part B | | | |
| MM$^{vi}$D$^{vi}$DQ resin, containing 0.6% Vi, consisting of 17% M, 0.5% Mvi, 75% D, 1.5% D$^{vi}$ and 6% Q | 96 | 96 | 38 |
| PolydiMeMeVi α,ω-vinylsiloxane, containing 2.5% Vi and of 0.4 Pa·s viscosity | 0 | 0 | 58 |
| Tetrabutyl orthotitanate | 4 | 4 | 4 |
| Karstedt's catalyst containing 10% platinum | 215 ppm | 215 ppm | 215 ppm |
| Hardness (Shore A) | 40 | 45 | 67 |

TABLE I-continued

| | 2-1 | 2-2 | 2-3 |
|---|---|---|---|
| Tensile strength (MPa) | 3.6 | 4.5 | 0.8 |
| Elongation at break (%) | 150 | 100 | 15 |
| Viscosity of A (mPa·s) | 2760 | 2040 | 2950 |
| Viscosity of B (mPa·s) | 4150 | 4190 | 2480 |
| Viscosity of A + B (mPa·s) | 3400 | 2250 | 2920 |

TABLE II

| | 3-1 | 3-2 | 3-4 | 3-3 |
|---|---|---|---|---|
| Part A | | | | |
| Suspension containing 25% reinforcing silica in an α,ω-vinyl PDMS of 1.5 Pa·s viscosity | 35 | 35 | 35 | 35 |
| α,ω-Vinyl PDMS of 1.5 Pa·s viscosity | 55 | 55 | 35 | 37 |
| α,ω-Vinyl PDMS of 100 Pa·s viscosity | 5 | 5 | 5 | 12 |
| PolydiMeMeVi α,ω-vinylsiloxane containing 2.5% Vi and of 0.4 Pa·s viscosity | 0 | 0 | 18 | 9 |
| PolydiMediMehydrogeno-α,ω-SiH, containing 7.5% SiH and of 0.3 Pa·s viscosity | 1.1 | 2.3 | 5 | 3.8 |
| α,ω-SiH PDMS containing 5% SiH | 4.2 | 0 | 0 | 0 |
| γ-Methacryloxypropyltrimethoxysilane | 1 | 1 | 1 | 1 |
| γ-Glycidoxypropyltrimethoxysilane | 1 | 1 | 1 | 1 |
| Ethynylcyclohexanol | 500 ppm | 500 ppm | 500 ppm | 400 ppm |
| Part B | | | | |
| Suspension containing 25% of reinforcing silica in an α,ω-vinyl PDMS of 1.5 Pa·s viscosity | 40 | 40 | 40 | 40 |
| α,ω-vinyl PDMS of 1.5 Pa·s viscosity | 56 | 56 | 56 | 56 |
| Tetrabutyl orthotitanate | 4 | 4 | 4 | 4 |
| Karstedt's catalyst containing 10% platinum | 215 ppm | 215 ppm | 215 ppm | 215 ppm |
| Hardness (Shore A) | 8 | 30 | 49 | 42 |
| Tensile strength (MPa) | 0.76 | 1 | 1.5 | 2.25 |
| Elongation at break (%) | 250 | 170 | 65 | 135 |
| Viscosity of A (MPa·s) | 2910 | 3800 | 2580 | 4330 |
| Viscosity of B (MPa·s) | 3400 | 3400 | 3400 | 3280 |
| Viscosity of A + B (MPa·s) | 3270 | 4190 | 2870 | 4760 |

The invention claimed is:

1. A composite having a capillary rise of less than 10 mm, the capillary rise being measured according to a T test, said composite being made of at least one fibrous support, excluding any architectural textile, impregnated right to the core with a crosslinked silicone elastomer, wherein said composite is obtained by:
    impregnating the fibrous support with a silicone composition:
        which is crosslinkable into an elastomer
        which consists of:
            (a) at least one polyorganosiloxane (POS) having, per molecule, at least two alkenyl, groups linked to the silicon;

(b) at least one polyorganosiloxane having, per molecule, at least three hydrogen atoms linked to the silicon;
(c) a catalytically effective quantity of at least one catalyst;
(d) at least one adhesion promoter comprising:
(d.1) at least one alkoxylated organosilane satisfying the following general formula:

(d.1)

in which:
$R^1$, $R^2$, $R^3$ are hydrogenated or hydrocarbon radicals, which are the same or differ from one another and represent hydrogen, a $C_1$-$C_4$ linear branched alkyl or a phenyl optionally substituted with at least one $C_1$-$C_3$ alkyl;
A is a $C_1$-$C_4$ linear or branched alkylene;
G is a valency bond;
$R^4$ and $R^5$ are radicals, which are identical or different and represent a linear or branched $C_1$-$C_4$ alkyl;
x'=0 or 1; and
x=0 to 2;
(d.2) at least one organosilicon compound comprising at least one epoxy radical; and
(d.3) at least one metal M chelate and/or a metal alkoxide of general formula $M(OJ)_n$, where n is the valency of M and J is a $C_1$-$C_8$ linear or branched alkyl, M being chosen from the group consisting of Ti, Zr, Ge, Li, Mn, Fe, Al and Mg;
(f) at least one crosslinking inhibitor;
(g) at least one polyorganosiloxane resin containing at least one alkenyl residue in its structure; and
(h) optionally, functional additives in order to impart specific properties and selected from the group consisting of dyes and stabilizers;
which has a dynamic viscosity of between 1000 and 7000 mPa·s at 25° C. before crosslinking;
and which has, after complete crosslinking by curing in a fan oven for 30 minutes at 150° C., at least one of the following mechanical properties:
a Shore A hardness of at least two,
a tensile strength of at least 0.5 N.mm$^{-2}$, and
an elongation at break of at least 50%;
and crosslinking said silicone composition applied on the support to be impregnated, the crosslinking being activated by heating the impregnated support to a temperature of between 50 and 200° C., while obviously taking into account the maximum heat resistance of the support.

2. The composite of claim 1, obtained from an impregnating silicone composition which is fluid, which does not contain a diluent, solvent or emulsifier, and which can impregnate a fibrous material right to the core and then be crosslinked.

3. The composite of claim 1, obtained from an impregnating silicone composition wherein the polyorganosiloxane (a) has units of formula:

$$W_a Z_b SiO_{(4-(a+b))/2}$$ (a.1)

in which:

W is an alkenyl group;
Z is a monovalent hydrocarbon group, which has no unfavorable effect on the activity of the catalyst and is chosen from alkyl groups having from 1 to 8 carbon atoms inclusive, optionally substituted with at least one halogen atom, and from aryl groups;
a is 1 or 2, b is 0, 1 or 2 and a+b is between 1 and 3; and
optionally, at least one portion of the other units are units of average formula:

$$Z_c SiO_{(4-c)/2}$$ (a.2)

in which z has the same meaning as above and c has a value between 0 and 3.

4. The composite of claim 1, obtained from an impregnating silicone composition wherein the polyorganosiloxane (b) contains siloxyl units of formula:

$$H_d L_e SiO_{(4-(d+e))/2}$$ (b.1)

in which:
L is a monovalent hydrocarbon group, which has no unfavorable effect on the activity of the catalyst and is chosen from alkyl groups having from 1 to 8 carbon atoms inclusive, optionally substituted with at least one halogen atom, and from aryl groups;
d is 1 or 2, e is 0, 1 or 2 and d+e has a value between 1 and 3;
optionally, at least one portion of the other units being units of average formula:

$$L_g SiO_{(4-g)/2}$$ (b.2)

in which L has the same meaning as above and g has a value between 0 and 3.

5. The composite of claim 1, obtained from an impregnating silicone composition wherein the proportions of (a) and of (b) are such that the molar ratio of the hydrogen atoms linked to the silicon in (b) to the alkenyl radicals linked to the silicon in (a) is between 0.4 and 10.

6. The composite of claim 1, obtained from an impregnating silicone composition wherein the adhesion promoter is present in an amount of 0.1 to 10% by weight relative to all of the constituents.

7. The composite as claimed in claim 1, wherein the fibrous support is a woven fabric, non-woven fabric, or knits, or any fibrous support comprising fibers and/or fibers chosen from the group of materials consisting of glass, silica, metals, ceramic, silicon carbide, carbon, boron, natural fibers, artificial fibers, and synthetic fibers.

8. The composite of claim 1, wherein said fibrous support is impregnated with said silicon composition at a pressure of at least 20 kg/cm$^2$.

9. In a method for forming a composite having a capillary rise of less than 10 mm, measured according to a T test, by impregnation of a fibrous material, excluding architectural textiles, right to the core with a crosslinkable silicone composition, wherein the improvement consists in:
impregnating the fibrous material with a silicone composition penetrate into said support under pressure, said silicone composition:
being crosslinkable into an elastomer;
which consists of:
(a) at least one polyorganosiloxane (POS) having, per molecule, at least two alkenyl, groups linked to the silicon;
(b) at least one polyorganosiloxane having, per molecule, at least three hydrogen atoms linked to the silicon;

(c) a catalytically effective quantity of at least one catalyst;

(d) at least one adhesion promoter comprising (d.1) at least one alkoxylated organosilane satisfying the following general formula:

(d.1)

in which:

$R^1$, $R^2$, $R^3$ are hydrogenated or hydrocarbon radicals, which are the same or differ from one another and represent hydrogen, a $C_1$-$C_4$ linear branched alkyl or a phenyl optionally substituted with at least one $C_1$-$C_3$ alkyl;

A is a $C_1$-$C_4$ linear or branched alkylene;

G is a valency bond;

$R^4$ and $R^5$ are radicals, which are identical or different and represent a linear or branched $C_1$-$C_4$ alkyl;

x'=0 or 1; and x=0 to 2;

(d.2) at least one organosilicon compound comprising at least one epoxy radical; and (d.3) at least one metal M chelate and/or a metal alkoxide of general formula $M(OJ)_n$, where n is the valency of M and J is a $C_1$-$C_8$ linear or branched alkyl, M being chosen from the group consisting of Ti, Zr, Ge, Li, Mn, Fe, Al and Mg;

(f) at least one crosslinking inhibitor;

(g) at least one polyorganosiloxane resin containing at least one alkenyl residue in its structure; and (h) optionally, functional additives in order to impart specific properties and selected from the group consisting of dyes and stabilizers;

which has a dynamic viscosity of between 1000 and 7000 mPa·s at 25° C. before crosslinking;

and which has, after complete crosslinking by curing in a fan oven for 30 minutes at 150° C., at least one of the following mechanical properties:

a Shore A hardness of at least two, a tensile strength of at least 0.5 [[,N.mm²]] N.mm$^{-2}$ and an elongation at break of at least 50%;

and crosslinking said silicone composition applied on the support to be impregnated, the crosslinking being activated by heating the impregnated support to a temperature of between 50 and 200° C., while obviously taking into account the maximum heat resistance of the support.

10. The method of claim 9, wherein said fibrous material is impregnated with said silicon composition at a pressure of at least 20 kg/cm².

* * * * *